United States Patent [19]
Campbell

[11] Patent Number: 5,921,262
[45] Date of Patent: Jul. 13, 1999

[54] APPARATUS AND METHOD FOR COLLECTION AND TRANSFER OF A LIQUID

[75] Inventor: Oakley Campbell, Weaverville, N.C.

[73] Assignee: Balcrank Products, Inc., Weaverville, N.C.

[21] Appl. No.: 08/862,075

[22] Filed: May 22, 1997

[51] Int. Cl.[6] .................................................... B65B 3/04
[52] U.S. Cl. ...................... 137/1; 137/592; 137/616.5; 184/1.5; 141/353; 141/387; 251/343
[58] Field of Search .................. 137/590, 592, 137/209, 616.5, 1; 184/1.5; 141/353, 387

[56] References Cited

U.S. PATENT DOCUMENTS

| | | | |
|---|---|---|---|
| 1,951,498 | 3/1934 | Whitney | 184/1.5 |
| 1,994,844 | 3/1935 | Winger et al. | 184/1.5 |
| 2,021,585 | 11/1935 | Zarovy | 184/1.5 |
| 2,531,765 | 11/1950 | Burress | 184/1.5 |
| 2,663,307 | 12/1953 | Birdwell | 251/343 |
| 3,190,223 | 6/1965 | Birdsall | 137/123 |
| 4,274,645 | 6/1981 | Ferguson et al. | 280/47.26 |
| 4,883,102 | 11/1989 | Gabrielyan et al. | 137/616.5 |
| 4,997,003 | 3/1991 | Brennan | 137/147 |
| 5,381,839 | 1/1995 | Dowd | 141/242 |

Primary Examiner—A. Michael Chambers
Attorney, Agent, or Firm—Carter & Schnedler, P.A.

[57] ABSTRACT

There is provided an apparatus and method for the collection and transfer of a liquid, which is preferably waste oil. The apparatus includes a tank having a top opening with a hollow tube projecting from the top opening into the interior of the tank. A hollow stem is slidably received within the hollow tube. A funnel, which initially receives the liquid, is attached to the top end of the stem which is located outside of the tank. An opening is provided in the wall of the stem near the lower end which is located inside the tank. A cover plate is received about the bottom of the stem. The hollow tube and the lower portion of the stem form a valve so that when the stem is raised, the opening in the stem is covered by the hollow tube, and thus is sealed from the inside of the tank, so that the liquid does not flow through the opening in the stem, and when the stem is lowered, the opening in the stem is outside of the hollow tube so that liquid may flow through the opening in the stem, which permits the liquid to be collected inside the tank. When the liquid is to be transferred out of the tank, the stem is raised, thereby closing the valve. Gas pressure is applied to the inside of the tank and the pressurized liquid is discharged from the tank through a liquid exit port which is located in the lower portion of the tank.

28 Claims, 2 Drawing Sheets

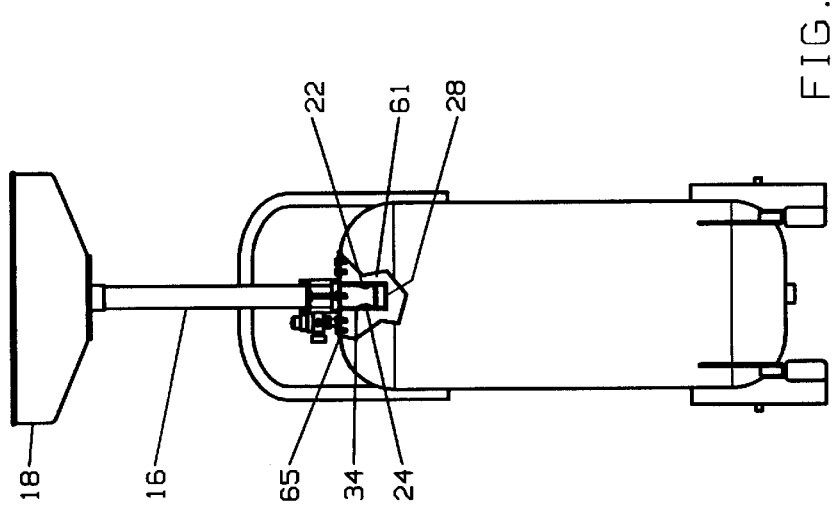
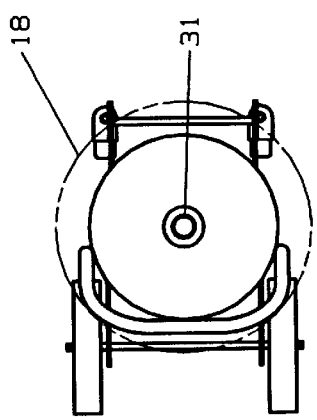
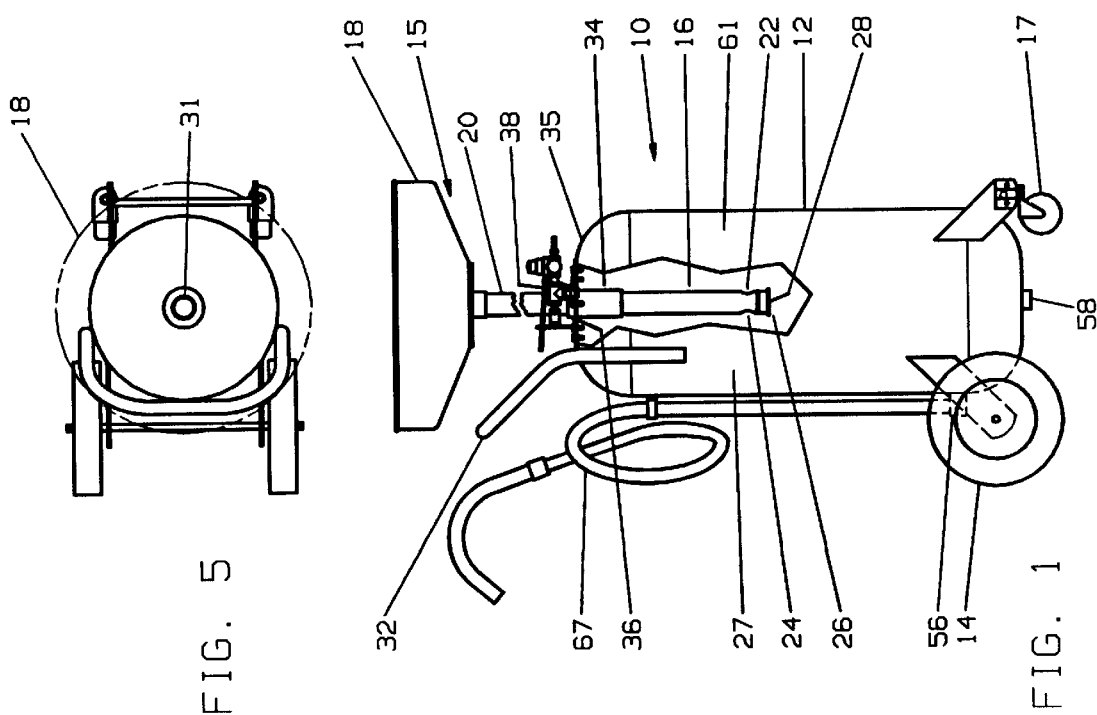

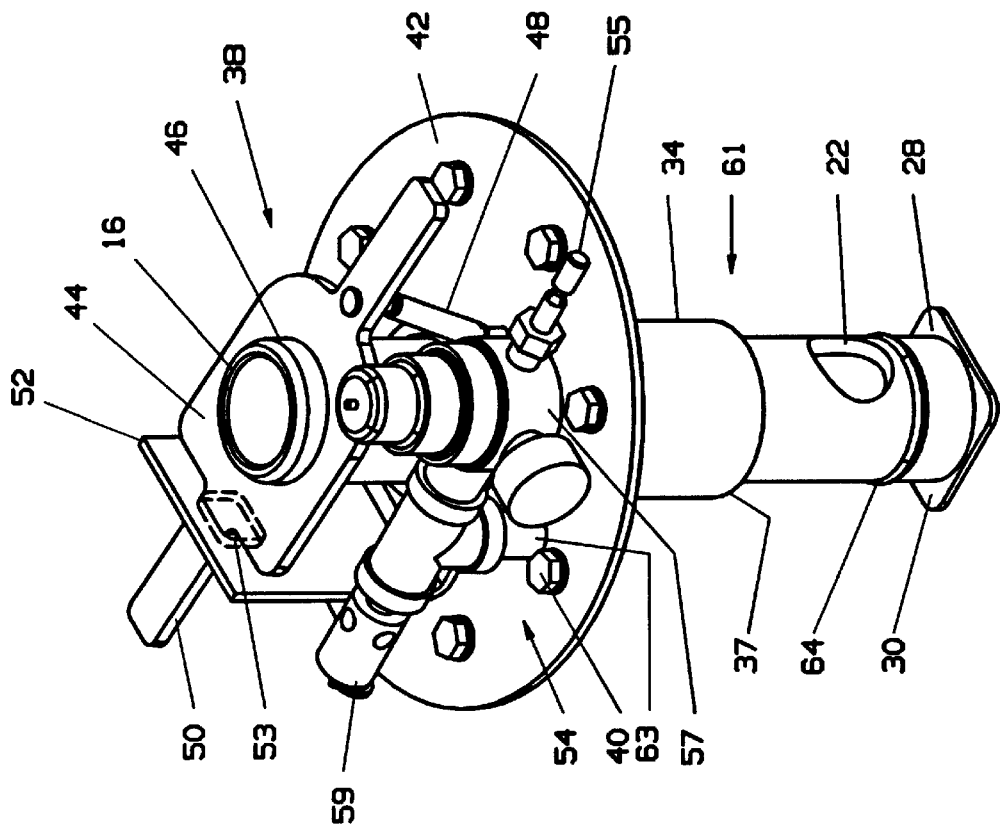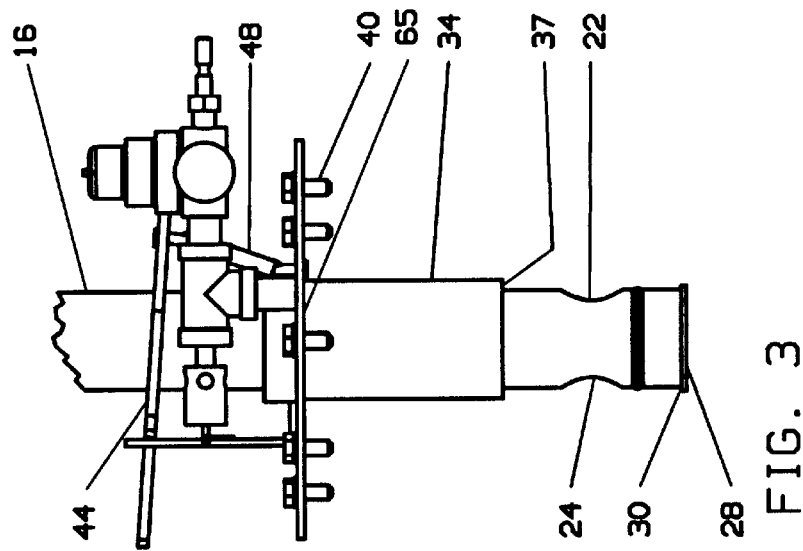

APPARATUS AND METHOD FOR COLLECTION AND TRANSFER OF A LIQUID

BACKGROUND OF THE INVENTION

This invention relates to apparatus for the collection and transfer of liquids. More particularly, it relates to apparatus for the collection of waste motor oil in a portable tank and the transfer of the waste motor oil from the portable tank to a larger holding tank.

There are many businesses which provide oil changes for automobiles and trucks, such as dealers, gas stations, and more recently, quick change motor oil businesses. Quick change motor oil businesses provide rapid oil changes for motor vehicles, often in less than one hour's time. The growth of quick change oil businesses has been substantial in recent years as consumers have demanded that this service be provided quickly and efficiently.

Quick change oil businesses normally utilize a portable oil collection apparatus which includes a tank having a funnel attached to the top of the tank through an opening in the tank. The funnel includes a stem which extends through the top opening of the tank into the interior of the tank. When it is time to collect waste oil from the vehicle crank case, the funnel is raised so that the distance between the oil drain hole on the crank case and the funnel is minimal to avoid spilling the oil due to misalignment, and splattering. Usually the funnel, and thus the stem, is lowered when the tank is not in use. This apparatus is located directly below a position where the vehicle crank case is positioned during the oil change. Often this apparatus is used in a pit under the floor. When the crank case is opened, waste oil will drain into the funnel and thus into the portable tank.

Once the tank is full, it is important to be able to efficiently and quickly transfer the waste oil from the portable collection apparatus to a larger permanent waste oil holding tank which is normally located outside of the building and often above level of the portable tank which is in the pit. The portable tank includes an exit port valve located near the bottom of the tank. A hose is connected to the exit port valve and to the permanent holding tank when it is time to transfer the waste oil. It is desirable to be able to quickly transfer the waste oil from the portable tank to the permanent tank. The oil is sometimes transferred by injecting high pressured gas, such as air, into the portable tank. Often air pressures inside of the tank will be as much as 30 lbs. per square inch. Because the bottom of the stem inside the tank is always open to permit the oil to drain from the funnel into the inside of the tank, the path through the stem must be closed off when air pressure is applied to the tank, otherwise waste oil would blow back into the stem and out of the funnel.

Prior art portable collection tanks often utilize a hand-operated ball valve which includes a handle on the exterior of the tank near the top of the tank to open and close the passageway through the stem. That is, the valve is cranked open when it is time for the oil to drain through the funnel into the tank, and is cranked closed when it is time to pressurize the tank to transfer the oil to the permanent tank. This hand-operated ball valve adds substantial expense to the waste oil collection apparatus, and because the condition of the valve, i.e., opened or closed, is not readily apparent to the operator, accidents sometime occur when air pressure is applied to the tank and the valve is inadvertently left open.

OBJECTS OF THE INVENTION

It is therefore one object of this invention to provide an improved apparatus and method for the collection and transfer of a liquid, preferably, automotive waste oil.

It is another object of this invention to provide an apparatus for the collection and rapid transfer of automotive waste oil which is easy to use and inexpensive to produce.

It is still another object of this invention to provide an apparatus and method for the transfer of automotive waste oil from a portable tank to a larger permanent tank utilizing air pressure, which reduces the likelihood of spillage of the oil.

SUMMARY OF THE INVENTION

In accordance with one form of this invention, there is provided an apparatus for the collection and transfer of a liquid. A tank is provided for receiving the liquid. The tank has a first opening, preferably on the top thereof, with a hollow tube extending from the first opening into the interior of the tank. A hollow stem is provided which is slidably received within the hollow tube. A liquid gathering device, which is preferably a funnel, is attached to one end of the hollow stem on the outside of the tank. The stem includes a second end for discharging the liquid located in the inside of the tank.

An opening is provided in the wall of the stem near the second end. The hollow tube and the opening in the wall near the stem form a valve so that when the opening in the stem is outside of the hollow tube, liquid may flow into the tank, and when the opening in the stem is on the inside of the tube, liquid may not flow into or out of the tank through the opening in the stem. The valve is preferably opened by lowering the stem, and the valve is closed by raising the stem. Preferably, the bottom of the stem is sealed with a plate having shoulders which extend past the end of the tube so that when the stem is pulled to the full upward position, the shoulders enhance the seal of the opening in the stem. Also, preferably, a groove is provided between the opening in the stem and the shoulder of the plate with a sealing device, such as an O-ring, being seated in the groove for further enhancing the seal. It is also preferred that an audible click emanate from the apparatus when the edges of the plate engage the second end of the hollow tube so that the operator is given a positive indication that the valve is closed. In addition, it is preferred that a spring biased assembly be provided for holding the slidable stem in its raised position to insure that the valve stays closed when the tank is pressurized. Furthermore, it is preferred that the tank include a liquid exit port attached to the tank near the bottom thereof for transferring the liquid out of the tank. It is also preferred that the tank include a pressurized gas inlet port which when subjected to gas pressure will cause the liquid to flow out the liquid outlet port, but not through the stem when the valve is closed.

In accordance with another form of this invention, there is provided a method for the collection and transfer of a liquid utilizing a tank having a first opening with a hollow tube extending into the first opening into the interior of the tank, and further, utilizing a hollow stem having a wall and first and second ends with a portion of the hollow stem slidably received inside the hollow tube, with an opening in the wall of the stem near the second end, and including a liquid gathering device attached to the first end of the stem on the outside of the tank, and with the second end being on the inside of the tank, such method including the steps of: lowering the stem into the tank so that the opening in the lower portion of the stem is outside of the hollow tube; collecting liquid in the liquid gathering device and permitting the liquid to travel through the hollow stem and out the opening in the lower portion of the stem and into the tank;

and raising the stem so that the opening in the stem near the second end thereof is received inside the hollow tube. It is preferred that gas pressure then be applied to the inside of the tank so that the liquid in the tank will be rapidly discharged from the tank through a second opening in the tank, but will not flow through the opening near the second end of the stem.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

FIG. 1 is a side elevational view of the apparatus of the subject invention with portions of the tank removed for illustrative purposes;

FIG. 2 is a perspective view of a portion of the apparatus of FIG. 1 and showing the valve portion of the apparatus in more detail;

FIG. 3 is a side elevational view of the apparatus shown in FIG. 2;

FIG. 4 is a front elevation view of the apparatus shown in FIG. 1 with the funnel and stem shown in the full elevated position and with portions of the tank removed for illustrative purposes; and FIG. 5 is a top plan view of the apparatus of FIG. 1.

DESCRIPTION OF THE PREFERRED EMBODIMENT

Referring now more particularly to FIG. 1, there is provided portable waste oil collection and transfer apparatus 10 which includes tank 12 having rear wheels 14 and front wheels 17 mounted thereto. Apparatus 10 includes oil capturing apparatus 15 which includes hollow stem 16 with funnel 18 being mounted to the first end 20 of the hollow stem. The hollow stem 16 includes a wall having a pair of openings 22 and 24 located near the second end 26 of the hollow stem. The second end 26 of the hollow stem 16 is closed by plate 28. Plate 28 includes shoulders 30 extending away from the second end 26 of stem 16.

As can be seen from FIG. 5, funnel 18 includes an opening 31 which is aligned with and is attached to the first end 20 of hollow stem 16, which is open.

Referring back to FIG. 1, handle 32 is attached to tank 12 so that the operator may readily move the apparatus 10 from place to place. Hollow tube 34 is attached to first opening 36 in the top of the tank. A small portion of hollow tube 34 extends above the top of the tank with the major portion of the hollow tube extending into the interior of the tank. Hollow stem 16 is slidably received in hollow tube 34.

A spring biased latching assembly 38 is attached to the top 35 of tank 12 by means of bolts 40 which are received in plate 42, as better seen with reference to FIGS. 2 and 3. Hollow tube 34 is welded to an opening in plate 42, which opening aligns with the first opening 36 in the top 35 of tank 12. The latching assembly 38 further includes plate 44 having opening 46 therein. Spring 48 biases plate 44 to the up position so that lever arm 50 of plate 44 which passes through slot 53 in upright rectangle plate 52 abuts against the top of slot 53. Rectangle plate 52 is attached to circular plate 42. Stem 16 passes through opening 46 of plate 44.

Air pressure apparatus 54 is also mounted on circular plate 42. Air pressure apparatus 54 includes air hose coupler 55 connected to regulator 57. Safety valve 59 is connected to regulator 57. Air inlet pipe 63 is connected between regulator 57 and safety valve 59 and through a second opening 65 in top 35 of tank 12.

Referring again to FIG. 1, oil exit port 56 is attached to the lower portion of tank 12 and communicates with the interior of tank 12. Exit port 56 is adapted to be connected to hose 67 for transferring oil from portable tank 12 to a large permanent tank (not shown), which may be elevated above the portable tank 12. Drain port 58 is also attached to the underside of tank 12.

Hose coupler 55 serves as an air inlet port and is adapted to be connected to a hose (not shown) which is further adapted to be connected to a source of pressurized air (not shown). As will be explained in more detail below, the purpose of the pressurized air is to pressurize tank 12 when it is time to transfer the waste oil inside of portable tank 12 to the permanent tank.

Referring now more particularly to FIG. 2, hollow stem 16 includes an angular groove 62 in the wall of the stem located between openings 22 and 24 and plate 28. A resilient sealing ring 64 is received in angular groove 62. The purpose of sealing ring 64 will be explained below.

As previously indicated, stem 16 is slidably received within hollow tube 34. Hollow tube 34, along with the lower portion 27 of stem 16 form a telescoping valve 61 which is particularly useful to close the fluid path when air pressure is applied through air inlet port 55 to the interior of the tank 12 at the time when the waste oil from the tank 12 is transferred to a larger permanent tank. As shown in FIG. 1, telescoping valve 61 is in the open position since the stem 16 and thus the funnel 18 are in the downward position, thereby exposing openings 22 and 24 in the lower portion of the stem to the interior of the tank.

In the position shown in FIGS. 1, 2 and 3, waste oil from a vehicle crank case, which is initially received in funnel 18 and passes through the interior of hollow stem 16, readily passes through openings 22 and 24 into the interior of tank 12. However, with the stem 16 in the raised position shown in FIG. 5, the valve 61 is closed because openings 22 and 24 are enclosed on the inside of hollow tube 34 and are in register with the inside surface of hollow tube 34. O-ring 64 abuts against the inside surface of hollow tube 34, thereby sealing closed the flow path between the openings 22 and 24 and the interior of tank 12. In addition, the shoulders 30 which extend from plate 28 abut against the lower rim 37 of hollow tube 34 to further enhance the seal.

When the operator raises the stem 16 and thus funnel 18 to their most elevated position, the engagement of shoulders 30 to the lower rim 37 of hollow tube 34 will cause an audible click, which confirms to the operator that the valve has been closed. Stem 16 is held in its most raised position, with the valve 61 closed, by means of the opening 46 in plate 44, which makes an angled contact with stem 16, thereby gripping the stem, as better seen in reference to FIGS. 2 and 3.

Spring 48 holds plate 44 in this angled position. When it is desirable to lower stem 16, and thus funnel 18, lever arm 50 is pushed downwardly through slot 53 in plate 52, thereby removing the grip on stem 16 which permits the stem, and thus the funnel 18, to be lowered.

The apparatus 10 may be operated as set forth below. Portable apparatus 10 which is located in a pit is placed under a vehicle which requires an oil change. Funnel 18 is aligned with the oil drain plug which is attached to the crank case of the vehicle. Telescoping valve 61 is moved to the open position, as shown in FIGS. 1, 2 and 3, by moving stem 16 to a lower position, thereby exposing openings 22 and 24 in the stem to the interior of tank 12. The openings 22 and 24 need not be as low, as shown in FIG. 1, in fact, it is preferred that the openings 22 and 24 be closer to the lower rim 37 of hollow tube 34, but not inside the hollow tube 34, as shown in FIGS. 2 and 3, so that the funnel 18 may be placed close to the crank case drain opening so as to reduce splattering and to insure alignment of the opening in the crank case and funnel 18. The stem is held in the correct position by means of plate 44, which when in the angled position, as shown in FIGS. 2 and 3, will grip stem 16 and prohibit it from slipping. The oil travels from the crank case into funnel 18 through the interior of hollow stem 16 through openings 22 and 24, and into the interior of tank 12.

After several oil changes and when the tank 12 is substantially full, it becomes time to transfer the waste oil from tank 12 to a permanent tank. The apparatus is rolled to a position adjacent to the permanent tank. Telescoping valve 61 is closed by first depressing lever arm 50 to release stem 16 and then raising stem 16 to its most elevated position, as shown in FIG. 5. When the operator hears the audible click of shoulders 30 abutting against the rim 37 of hollow tube 34, the operator knows that the stem is in its most elevated position and thus the valve 61 is, indeed, closed. The operator then releases lever arm 50 so that spring actuated plate 44 automatically moves to its angled position, thereby holding stem 16 in its most elevated position. Oil drain hose 67, which is attached to exit port 56, is connected to the permanent tank. An air pressure hose is attached to air inlet port 55. Air pressure is then applied to the interior of tank 12, thereby forcing the waste oil out of the tank through the exit port 56 and hose 67 and into the permanent tank. With the valve 61 being closed, the waste oil will not pass back up stem 16. After the oil has been transferred out of tank 12, the stem 16 may then be released by moving lever arm 50 downwardly to release the stem 16 so that the stem may be lowered so as to open valve 61. The apparatus 10 is in condition to receive waste oil once again.

Thus there is provided an inexpensive apparatus for collecting and transferring waste oil which utilizes a unique telescoping valve which may be conveniently and assuredly closed by the operator whenever air pressure is applied to the tank to transfer the waste oil from the tank without running the risk of the waste oil travelling back up stem 16 during the transfer.

From the foregoing description of the preferred embodiment of the invention, it will be apparent that many modifications may be made therein. It will be understood, however, that the embodiment of the invention is an exemplification of the invention only and that the invention is not limited thereto. It is to be understood, therefore, that it is intended in the appended claims to cover all modifications as fall within the true spirit and scope of the invention.

I claim:

1. A method for the collection and transfer of a liquid utilizing a tank having a first opening therein and a hollow tube extending from the first opening into the tank, and further utilizing a hollow stem including a wall and first and second ends with a portion of the hollow stem being slidably received in the hollow tube with an opening in the wall of the stem and with the hollow tube and opening in the wall of the stem forming a valve, comprising the steps of:

lowering said hollow stem, thereby opening said valve;

collecting oil in said tank which passes through said hollow stem and through said opening in said stem;

raising said stem, thereby closing said valve.

2. A method as set forth in claim 1, wherein a liquid outlet port is attached to the tank for transferring the liquid from said tank, including the step of:

applying gas pressure to the inside of the tank which forces liquid out of said tank through the liquid outlet port, but not through the opening in the wall of the hollow stem.

3. A method as set forth in claim 1, further including the step of securing the stem in position after completion of the step of raising the stem.

4. An apparatus for collection and transfer of a liquid comprising:

a tank for receiving the liquid; said tank having a first opening;

a hollow tube extending from said first opening in said tank into the interior of said tank;

a hollow stem having first and second end portions; said hollow stem slidably received in said hollow tube;

an opening in said first end portion of said stem for receiving liquid prior to the liquid being received in said tank; said second end portion of said stem received in the interior of said tank; said stem having at least one opening therein for discharging liquid into said tank when said opening in said stem is not received in said hollow tube; said opening in said stem being covered when said opening in said stem is received on the inside of said hollow tube so that liquid will not flow from the interior of said tank through said stem.

5. An apparatus as set forth in claim 4, wherein said opening in said stem is located near said second end portion of said stem; said stem including a wall; said opening in said stem being in said wall; said stem including a bottom; said bottom being sealed.

6. An apparatus as set forth in claim 5, further including a shoulder extending from said bottom of said stem; said hollow tube including a lower rim; said shoulder engaging said lower rim of said hollow tube when said stem is pulled upwardly to its most upright position.

7. An apparatus as set forth in claim 6, further including a groove located between said opening in said stem and said shoulder; a sealing device received in said groove for providing a seal when said sealing device is received inside said hollow tube.

8. An apparatus as set forth in claim 7, wherein said sealing device is a resilient O-ring.

9. An apparatus as set forth in claim 7, wherein (a) said portions of said stem slidably received in said hollow tube including said opening in said stem, said sealing device and said shoulder, and (b) said hollow tube, forming a valve; said valve being open when said stem is in a lower position and said valve being closed when said stem is in an elevated position.

10. An apparatus as set forth in claim 9, whereby an audible click is provided when said shoulder engages said lower rim of said hollow tube, thereby providing a positive indication that said valve is closed.

11. An apparatus as set forth in claim 10, further including an assembly for securing said stem in an elevated position.

12. An apparatus as set forth in claim 11, wherein said assembly is a spring biased plate having a hole therethrough; said stem slidably received in said hole in said plate.

13. An apparatus as set forth in claim 10, further including a liquid exit port attached to said tank for discharging liquid from said tank.

14. An apparatus as set forth in claim 13, further including a pressurized gas inlet port attached to said tank, whereby when pressured gas is applied to said tank when said valve is closed, liquid will flow through said liquid exit port and not through said opening in said stem.

15. An apparatus as set forth in claim 4, wherein said liquid is waste oil.

16. An apparatus as set forth in claim 4, wherein said opening in first end portion of said stem is attached to a funnel.

17. An apparatus for collection and transfer of a liquid comprising:

- a tank for receiving the liquid; said tank having a first opening;
- a hollow tube extending from said first opening in said tank into the interior of said tank;
- a hollow stem having a wall and a first end and a second end;
- a liquid gathering device attached to said first end of said stem on the outside of said tank; said second end of said stem being on the inside of said tank;
- a portion of said hollow stem slidably received in said hollow tube;
- an opening in said wall of said stem; said hollow tube and said opening in said wall of said stem forming a valve, whereby when said opening in said stem is outside said hollow tube, said valve is open and liquid may flow into said tank, and when said opening in said stem is inside said tube, said valve is closed and liquid may not flow into or out of said tank through said opening in said stem.

18. An apparatus as set forth in claim 17, wherein said tank includes a top portion; said first opening in said tank being in said top portion; said opening in said stem being near said second end; said stem adapted to be raised and lowered; when said stem is lowered, said valve is open; when said stem is raised, said valve is closed.

19. An apparatus as set forth in claim 18, wherein the second end of said stem includes a bottom; said bottom of said second end of said stem being sealed.

20. An apparatus as set forth in claim 19, further including a shoulder extending from said bottom of said stem; said hollow tube having a lower rim; said shoulder engaging said lower rim of said hollow tube when said stem is pulled upwardly to its most upright position.

21. An apparatus as set forth in claim 20, further including an angular groove located between said opening in said stem and said shoulder; a resilient sealing device received in said groove.

22. An apparatus as set forth in claim 21, whereby an audible click is provided when said shoulder engages said lower rim of said hollow tube, thereby providing a positive indication that said valve is closed.

23. An apparatus as set forth in claim 22, further including an assembly for securing said stem in an elevated position.

24. An apparatus as set forth in claim 23, wherein said assembly is a spring biased plate having a hole therethrough; said stem slidably received in said hole in said plate.

25. An apparatus as set forth in claim 24, further including a liquid exit port attached to said tank for discharging liquid from said tank.

26. An apparatus as set forth in claim 25, further including a pressurized gas inlet port attached to said tank, whereby when pressured gas is applied to said tank and said valve is closed, liquid will flow through said liquid exit port and not through said opening in said stem.

27. An apparatus as set forth in claim 17, wherein said liquid is waste oil.

28. An apparatus as set forth in claim 17, wherein said liquid gathering device is a funnel.

* * * * *